United States Patent
Phillips et al.

(10) Patent No.: US 9,048,488 B2
(45) Date of Patent: Jun. 2, 2015

(54) PASTED ZINC ELECTRODE FOR RECHARGEABLE NICKEL-ZINC BATTERIES

(71) Applicant: PowerGenix Systems, Inc., La Jolla, CA (US)

(72) Inventors: Jeffrey Phillips, La Jolla, CA (US); Samaresh Mohanta, San Diego, CA (US); Cecelia Maske, San Diego, CA (US); Deepan Chakkaravarthi Bose, San Diego, CA (US); James J. Wu, Olmstead Township, OH (US); Bryan L. McKinney, San Diego, CA (US)

(73) Assignee: PowerGenix Systems, Inc., San Diego, CA (US)

( * ) Notice: Subject to any disclaimer, the term of this patent is extended or adjusted under 35 U.S.C. 154(b) by 0 days.

(21) Appl. No.: 13/938,520

(22) Filed: Jul. 10, 2013

(65) Prior Publication Data
US 2014/0157586 A1    Jun. 12, 2014

Related U.S. Application Data

(62) Division of application No. 12/467,993, filed on May 18, 2009, now Pat. No. 8,501,351.

(51) Int. Cl.
*H01M 4/00*      (2006.01)
*H01M 4/26*      (2006.01)
(Continued)

(52) U.S. Cl.
CPC .............. *H01M 4/26* (2013.01); *H01M 4/0416* (2013.01); *H01M 4/244* (2013.01); *H01M 4/32* (2013.01); *H01M 10/30* (2013.01); *Y02E 60/124* (2013.01); *H01M 4/0404* (2013.01)

(58) Field of Classification Search
USPC ........................... 429/226, 623.5, 229; 29/223
See application file for complete search history.

(56) References Cited

U.S. PATENT DOCUMENTS

| 4,118,551 A | 10/1978 | Chireau et al. |
| 5,215,836 A | 6/1993 | Eisenberg |

(Continued)

FOREIGN PATENT DOCUMENTS

| CN | 1947281 A | 4/2007 |
| CN | 101194390 A | 6/2008 |

(Continued)

OTHER PUBLICATIONS

International Search Report and Written Opinion dated Aug. 13, 2010, from PCT Application No. PCT/US2010/035266.

(Continued)

*Primary Examiner* — Cynthia H Kelly
*Assistant Examiner* — Monique Wills
(74) *Attorney, Agent, or Firm* — Weaver Austin Villeneuve & Sampson LLP

(57) ABSTRACT

Active material for a negative electrode of a rechargeable zinc alkaline electrochemical cell is made with zinc metal particles coated with tin and/or lead. The zinc particles may be coated by adding lead and tin salts to a slurry containing zinc particles, a thickening agent and water. The remaining zinc electrode constituents such as zinc oxide (ZnO), bismuth oxide ($Bi_2O_3$), a dispersing agent, and a binding agent such as Teflon are then added. The resulting slurry/paste has a stable viscosity and is easy to work with during manufacture of the zinc electrode. Further, the zinc electrode is much less prone to gassing when cobalt is present in the electrolyte. Cells manufactured from electrodes produced in accordance with this invention exhibit much less hydrogen gassing, by as much as 60-80%, than conventional cells. The cycle life and shelf life of the cells is also enhanced, as the zinc conductive matrix remains intact and shelf discharge is reduced.

20 Claims, 7 Drawing Sheets

(51) Int. Cl.
*H01M 4/04* (2006.01)
*H01M 4/24* (2006.01)
*H01M 4/32* (2006.01)
*H01M 10/30* (2006.01)

(56) References Cited

U.S. PATENT DOCUMENTS

| | | |
|---|---|---|
| 6,787,265 B2 | 9/2004 | Phillips |
| 6,797,433 B2 | 9/2004 | Phillips |
| 6,811,926 B2 | 11/2004 | Phillips |
| 6,818,350 B2 | 11/2004 | Phillips |
| 6,835,499 B2 | 12/2004 | Phillips |
| 7,435,395 B2 | 10/2008 | Durkot et al. |
| 8,501,351 B2 | 8/2013 | Phillips et al. |
| 2003/0027046 A1 | 2/2003 | Hosokawa et al. |
| 2003/0190524 A1 | 10/2003 | Phillips |
| 2004/0191610 A1 | 9/2004 | Yoppolo et al. |
| 2005/0186478 A1 | 8/2005 | Iwakura et al. |
| 2006/0127761 A1 | 6/2006 | Phillips |
| 2006/0207084 A1 | 9/2006 | Phillips |
| 2006/0240317 A1 | 10/2006 | Phillips et al. |
| 2011/0039139 A1 | 2/2011 | Phillips et al. |
| 2011/0086252 A1 | 4/2011 | Phillips |

FOREIGN PATENT DOCUMENTS

| | | | |
|---|---|---|---|
| CN | 101740762 A | 6/2010 | |
| GB | 1444695 | 8/1976 | |
| JP | 58-218761 A | 12/1983 | |
| JP | 58218761 * | 12/1983 | .............. H01M 4/42 |
| JP | 59-175557 A | 10/1984 | |
| JP | H01-309260 A | 12/1989 | |
| JP | 10-144313 | 5/1998 | |
| JP | 2002-042817 A | 2/2002 | |
| JP | 2003-077477 A | 3/2003 | |
| JP | 2005-235674 A | 9/2005 | |
| JP | 2006-179430 A | 7/2006 | |
| JP | 2008-532249 A | 8/2008 | |
| WO | WO02/39534 | 5/2002 | |
| WO | WO02/075830 | 9/2002 | |
| WO | WO2005/020353 | 3/2005 | |
| WO | WO2005/112148 | 11/2005 | |
| WO | WO2006/094110 | 9/2006 | |
| WO | WO2006/116496 | 11/2006 | |
| WO | WO2010/135331 | 11/2010 | |

OTHER PUBLICATIONS

PCT International Preliminary Report on Patentability dated Dec. 1, 2011 issued in PCT Application No. PCT/US2010/035266.
EP Examination Report dated Feb. 22, 2013 in EP Application No. 10724181.2.
EP Examination Report dated Jul. 23, 2013 in EP Application No. 10724181.2.
U.S. Notice of Allowance dated Jun. 21, 2013 for U.S. Appl. No. 12/467,993.
U.S. Notice of Allowance dated Apr. 26, 2013 for U.S. Appl. No. 12/467,993.
U.S. Office Action dated Oct. 10, 2012 for U.S. Appl. No. 12/467,993.
U.S. Final Office Action dated Mar. 28, 2012 for U.S. Appl. No. 12/467,993.
U.S. Office Action dated Jul. 27, 2011 for U.S. Appl. No. 12/467,993.
Chinese Office Action dated Jun. 10, 2014 in CN Application No. 201080022093.8.
Chinese Office Action dated Oct. 10, 2013 in CN Application No. 201080022093.8.
Japanese Office Action dated Apr. 1, 2014 JP Application No. 2012-511964.
Chinese Office Action dated Jan. 16, 2015 in CN Application No. 201080022093.8.
Japanese Office Action dated Feb. 24, 2015 JP Application No. 2012-511964.

* cited by examiner

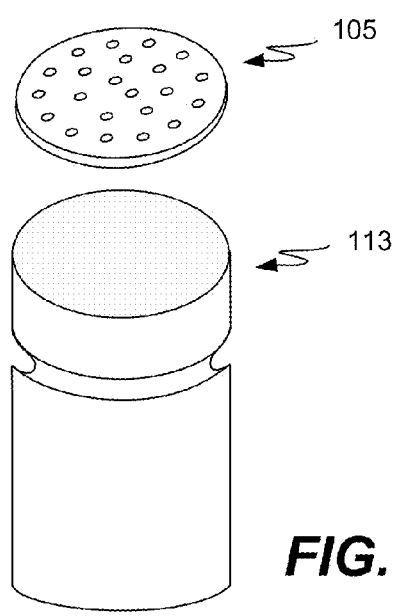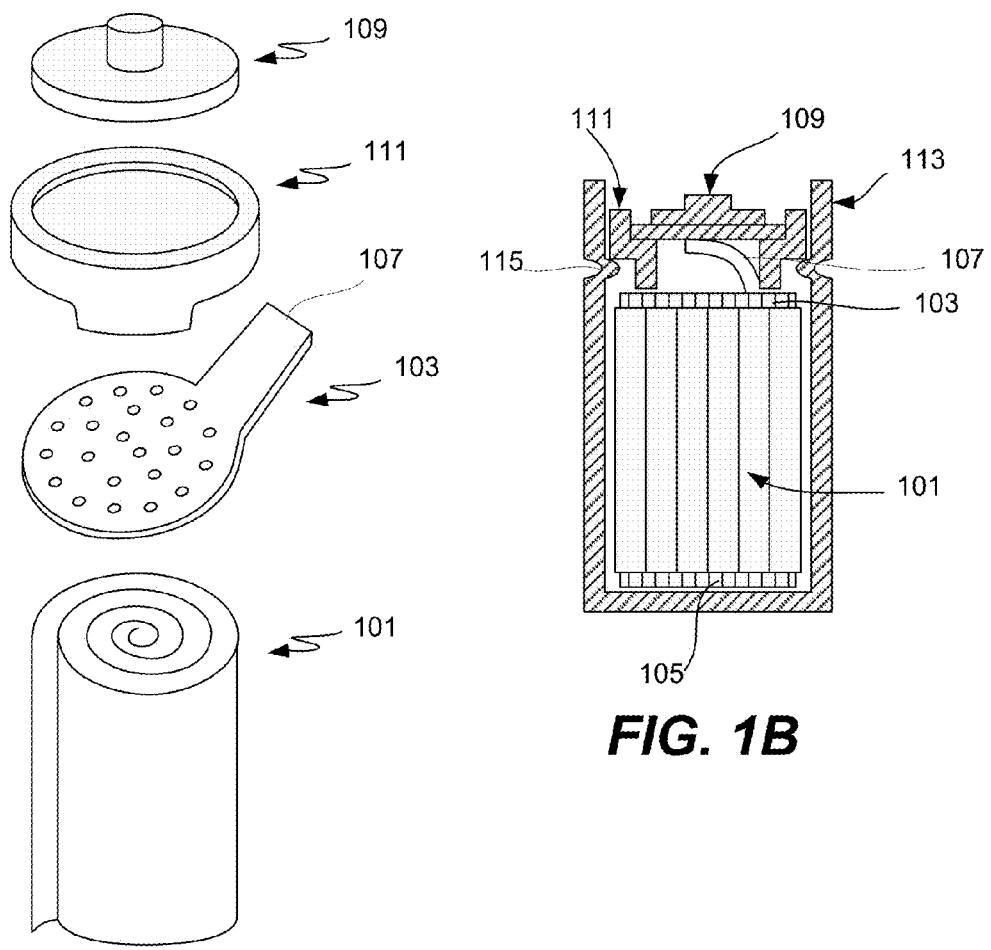
FIG. 1A
FIG. 1B

PASTED ZINC ELECTRODE FOR RECHARGEABLE NICKEL-ZINC BATTERIES

CROSS-REFERENCE TO RELATED APPLICATIONS

This application is a divisional of U.S. application Ser. No. 12/467,993, titled "Pasted Zinc Electrode for Rechargeable Zinc Batteries" filed on May 18, 2009 naming Phillips et al. as inventors, which is incorporated herein by reference in its entirety and for all purposes.

FIELD OF INVENTION

This invention pertains generally to rechargeable batteries and specifically rechargeable nickel-zinc batteries. More specifically, this invention pertains to the composition and manufacturing methods for a negative zinc electrode used in rechargeable nickel-zinc batteries.

BACKGROUND

The popularity of cordless portable devices, such as power tools, has increased the needs and requirements for high energy density rechargeable batteries that can also deliver high power. As power and energy density requirements increase, the need for a high cycle life rechargeable electrode also increases. The alkaline zinc electrode is known for its high voltage, low equivalent weight and low cost. The fast electrochemical kinetics associated with the charge and discharge process enables the zinc electrode to deliver both high power and high energy density.

The low redox potential associated with zinc renders the electrode unstable with respect to hydrogen evolution. Primary alkaline batteries that employ zinc have dealt with this problem by alloying zinc with specific elements and using gassing inhibitors. The purity of materials coming in contact with zinc is important, as well as limiting the exposure of zinc to any hydrogen evolution catalyst. The differences between the starting materials for the primary and rechargeable cell affect the techniques and the effectiveness of any corrosion inhibition approach. Zinc primary batteries are manufactured in a charged state while zinc secondary batteries are manufactured in a largely discharged state. In zinc primary batteries, the active material is metallic zinc in a gelled powder form with particles between 100 to 300 microns. In zinc secondary batteries, the active material is zinc oxide (ZnO), with small amounts of zinc metal, with particle size on the order of 0.2 to 0.3 microns. The small zinc oxide particle size used in the negative electrode of rechargeable cells results in a surface area that is 2 orders of magnitude larger than the particles in zinc electrodes used in primary batteries. The corrosion rate of zinc is significantly higher in a secondary battery, once it is formed after the initial charge. Improvements in rechargeable zinc electrode composition and manufacturing technique to minimize corrosion and improve manufacturability continue to be sought.

SUMMARY OF THE INVENTION

Active material for a negative electrode of a rechargeable zinc alkaline electrochemical cell is made with zinc metal particles coated with tin and/or lead. The zinc particles may be coated by adding lead and tin salts to a mixture containing zinc particles, a thickening agent and water. The remaining zinc electrode constituents such as zinc oxide (ZnO), bismuth oxide ($Bi_2O_3$), a dispersing agent, and a binding agent such as Teflon are then added. The zinc metal can be coated while in the presence of zinc oxide and other constituents of the electrode. The resulting slurry/paste has a stable viscosity and is easy to work with during manufacture of the zinc electrode. Further, the zinc electrode is much less prone to gassing when cobalt is present in the electrolyte. Cells manufactured from electrodes produced in accordance with this invention exhibit much less hydrogen gassing, by as much as 60-80%, than conventional cells. The cycle life and shelf life of the cells is also enhanced, as the zinc conductive matrix remains intact and shelf discharge is reduced.

In one aspect, the present invention pertains to a nickel zinc cell having a negative zinc electrode. The electrode includes zinc powder particles that are coated with lead, tin or both and are less than about 100 microns in size, less than about 40 microns in size, about 25 microns in size, or about 5-15 microns in size. Metallic zinc particles are added in the electrode to create and maintain a conductive matrix during cycling. Lead and tin, being nobler than zinc, will not be discharged at the zinc potential and will protect the zinc particles they coat. The electrode will maintain better connectivity during discharge. Only small amounts of lead and tin are used. According to various embodiments, the lead may be less than about 0.05% of the zinc electrode active material and the tin may be than about 1% of the zinc electrode active material. The nickel zinc cell also includes a positive nickel electrode. The positive electrode may contain cobalt and/or a cobalt compound, which may be a coated onto nickel hydroxide particles or be added to the positive electrode separately either as cobalt metal, cobalt oxide, cobalt hydroxide, cobalt oxyhydroxide, and/or other cobalt compounds. The positive electrode may also include uncoated nickel hydroxide particles.

Another aspect of the present invention pertains to a method of making a zinc negative electrode for a nickel-zinc cell. The method includes coating lead and/or tin onto zinc metal particles, preferably in a slurry, using the zinc particle to form an active material slurry/paste, and incorporating the active material into a zinc electrode. According to various embodiments, at least one soluble tin salt and at least one soluble lead salt is added to zinc metal particles in a liquid medium, preferably water, to coat the zinc particles. The liquid medium may also include a thickening agent (a thixotropic agent), and/or a binder. The tin and lead is allowed to coat the zinc particle. The tin salt may be one or more of tin sulfate, tin acetate, tin fluoborate, tin chloride, and tin nitrate. The lead salt may be one or more of lead acetate, lead chloride, lead fluoborate, or lead nitrate. The coating operation may result in a slurry that can be used to form the active material. In some embodiments, the slurry may be treated before being incorporated into the active material. For example, the slurry may be concentrated, heated, or washed. The zinc particle slurry may also include some residual tin and lead salt in solution. The residual tin and lead salt may subsequently coat electrochemically formed zinc (after cell formation) to further protect the zinc from corrosion.

An active material slurry/paste is formed using the zinc particle slurry. Remaining zinc electrode constituents are added to the slurry. These constituents may include zinc oxide, bismuth oxide, a dispersing agent, a binding agent, and a liquid. Other additives may be included such as an insoluble corrosion inhibiting agent. These constituents may be in a pre-mixed powder form when added to the slurry, forming a slurry or paste that may be worked after mixing. An aspect of the manufacturing of the negative electrodes is the slurry and paste's stability over the time period of manufacturing. The paste/slurry needs to be stable over the time period from slurry preparation to pasting on the substrate—a process that may take 4-6 hours or more. The addition of minute quantities of lead and tin is found to make the paste/slurry stable. In certain embodiments, the soluble lead and soluble tin may be added separately. For example, a pre-dissolved tin salt solution may be added to the active material paste after the remaining zinc electrode constituents. The lead concentration in the paste may be at most about 0.05% by weight, and the tin concentration may be at most about 1% by weight.

Tests at a temperature of 60° C. show that the gassing due to corrosion of zinc in the fully charged cell is reduced by 60-80% when cells incorporate the zinc electrodes. The lower gassing reduces self-discharge and pressure in the cell which results in reduced electrolyte leakage and visual bulging.

Zinc particles are added to the electrode in manufacturing to create and maintain a conductive matrix in the electrode during cycling. The metallic zinc particles used are larger than the zinc oxide particles and are less than about 100 microns, or less than about 40 microns in size. The size of the metallic zinc particles may prevent complete discharge to leave an intact internal core that despite its metallic character may lose connectivity due to insulating surface oxides. Keeping an inert but conductive layer, i.e. tin and lead, on the surface of zinc particle will help maintain the integrity of zinc particles.

In yet another aspect, the present invention pertains to an as-fabricated zinc electrode. The electrode includes a conductive substrate layer and an active material layer having zinc oxide, zinc particles coated with lead and/or tin, bismuth oxide, and a binding agent. The zinc particles may be coated using the process described herein or be procured precoated with a specified amount of lead and/or tin. The lead concentration in the active material may be at most about 0.05% by weight, and the tin concentration may be at most about 1% by weight.

These and other features and advantages are discussed further below with reference to the associated drawings.

BRIEF DESCRIPTION OF THE DRAWINGS

FIG. 1A is an exploded diagram view of a cylindrical battery cell suitable for incorporating various embodiments of the present invention.

FIG. 1B is a cross-section diagram view of a cylindrical battery cell suitable for incorporating various embodiments of the present invention.

DETAILED DESCRIPTION OF THE PRESENT INVENTION

Figure 2:
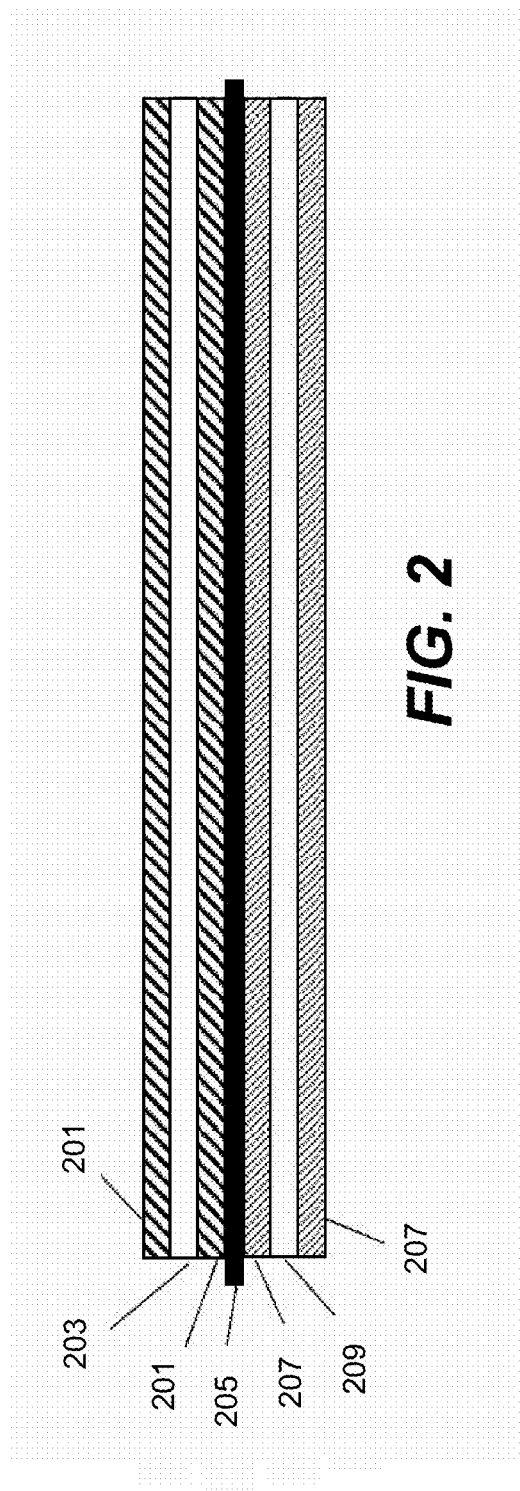
FIG. 2 is a cross section view of various layers of a separator.

Embodiments of the present invention are described herein in the context of manufacturing a negative zinc-zinc oxide electrode and in the context of a negative zinc-zinc oxide active material for a nickel-zinc cell. Those of ordinary skill in the art will realize that the following detailed description of the present invention is illustrative only and is not intended to be in any way limiting. Other embodiments of the present invention will readily suggest themselves to skilled persons having the benefit of this disclosure. For example, this invention may be used in other rechargeable batteries such as silver-zinc or zinc-air batteries. In this disclosure, the terms "battery" and "cell" may be used interchangeably.

Introduction

The present invention provides an improved process for making negative electrodes for use in rechargeable zinc cells. The present invention renders the manufacturing process much more manageable. The resulting rechargeable cells of the present invention possess one or more of the following characteristics: long shelf life, long cycle life, low leakage and little or no bulging.

Conventional positive nickel electrodes include cobalt particles in the active material. The cobalt particles may be provided as cobalt metal and/or cobalt oxide (or sometimes cobalt hydroxide or cobalt oxyhydroxide). The inventors have appreciated that dissolved cobalt may migrate from the positive electrode before the formation process of the cell is completed. The migration may occur during the time period between filling the cell with electrolyte and the application of the first charge or during the first charge which is part of the formation process of the electrochemical cell. The cobalt migration is less of an issue for a sintered positive electrode than a pasted positive electrode. The source of the cobalt also affects whether it would dissolve in the electrolyte and migrate to the positive electrode. Generally, freely added cobalt/cobalt compounds are more likely to migrate than cobalt that is coated on or incorporated into other particles, for example, the nickel hydroxide particles that make up a typical positive electrode. The inventors have found that cobalt at the negative electrode can catalyze hydrogen evolution in the negative electrode. A particular feature of the present invention is mitigating this catalytic effect of cobalt.

Sealed rechargeable Ni—Zn batteries have been developed for high power applications, such as power tools and hybrid electric vehicles. These batteries show exceptional high-rate charge and discharge capability with maximum power densities in excess of 2000 W/kg. The effects of soluble cobalt species can be particularly detrimental on this type of battery by accelerating hydrogen evolution during both the operation and the storage of the battery. Accelerated hydrogen evolution can result in cell-to-cell imbalance in multi-cell batteries and may promote the occurrence of dendritic shorts that can result in early failures.

Alkaline electrolytes have been developed to check the growth of dendrites but their effectiveness is reduced in the presence of cobalt contamination. Examples of advanced alkaline electrolytes for rechargeable Ni—Zn batteries are disclosed in U.S. Patents Publication US20060127761, titled "Electrolyte Composition For Nickel-Zinc Batteries" by Jeffrey Phillips, which is incorporated herein by reference.

Electrochemical Reactions of Nickel Zinc Batteries

The charging process for a nickel hydroxide positive electrode in an alkaline electrochemical cell is governed by the following reaction:

$$Ni(OH)_2 + OH^- \rightarrow NiOOH + H_2O + e^- \quad (1)$$

Alkaline electrolyte acts as ion carrier in the Zn electrode. In the rechargeable Zn electrode, the starting active material is the ZnO powder or a mixture of zinc and zinc oxide powder. The ZnO powder dissolves in the KOH solution to form the zincate ($Zn(OH)_4^{2-}$) that is reduced to zinc metal during the charging process. The reaction at the Zn electrode can be written as follows:

$$ZnO + 2OH^- + H_2O \rightarrow Zn(OH)_4^{2-} \quad (2)$$

and $$Zn(OH)_4^{2-} + 2e^- \rightarrow Zn + 4OH^- \quad (3)$$

Therefore, net electrode at the negative is $$ZnO + H_2O + 2e^- \rightarrow Zn + 2OH^- + 2e^- \quad (4)$$

Then, the overall Ni/Zn battery reaction can be expressed as follows:

$$Zn + 2NiOOH + H_2O = ZnO + 2Ni(OH)_2 \quad (5)$$

In the discharging process of the zinc electrode, the zinc metal donates electrons to form zincate. At the same time, the concentration of the zincate in the KOH solution increases. The increase in the zincate concentration leads to a precipitation of zincate to form the ZnO, shown as reaction 103. These transformations and agglomerations that occur at the zinc electrode are major factors in the eventual loss in activity of the electrode over many charge and discharge cycles. Some of the improvements in Ni—Zn battery technology to eliminate the zincate precipitation in the separator are disclosed in the previous referenced U.S. Patents Publication US20060127761 and U.S. Patent Publication US20060207084, titled "Method of Manufacturing Nickel Zinc Batteries" by Jeffrey Phillips, incorporated herein by reference.

Nickel Battery and Battery Components

FIGS. 1A and 1B are graphical representations of the main components of a cylindrical power cell according to an embodiment of the invention, with FIG. 1A showing an exploded view of the cell. Alternating electrode and electrolyte (separator) layers are provided in a cylindrical assembly 101 (also called a "jellyroll"). The cylindrical assembly or jellyroll 101 is positioned inside a can 113 or other containment vessel. A negative collector disk 103 and a positive collector disk 105 are attached to opposite ends of cylindrical assembly 101. The negative and positive collector disks function as internal terminals, with the negative collector disk electrically connected to the negative electrode and the positive collector disk electrically connected to the positive electrode. A cap 109 and the can 113 serve as external terminals. In the depicted embodiment, negative collector disk 103 includes a tab 107 for connecting the negative collector disk 103 to cap 109. Positive collector disk 105 is welded or otherwise electrically connected to can 113. In other embodiments, the negative collector disk connects to the can and the positive collector disk connects to the cap.

The negative and positive collector disks 103 and 105 are shown with perforations, which may be employed to facilitate bonding to the jellyroll and/or passage of electrolyte from one portion of a cell to another. In other embodiments, the disks may employ slots (radial or peripheral), grooves, or other structures to facilitate bonding and/or electrolyte distribution.

A flexible gasket 111 rests on a circumferential bead 115 provided along the perimeter in the upper portion of can 113, proximate to the cap 109. The gasket 111 serves to electrically isolate cap 109 from can 113. In certain embodiments, the bead 115 on which gasket 111 rests is coated with a polymer coating. The gasket may be made from any material that electrically isolates the cap from the can. Preferably the material does not appreciably distort at high temperatures; one such material is nylon. In other embodiments, it may be desirable to use a relatively hydrophobic material to reduce the driving force that causes the alkaline electrolyte to creep and ultimately leak from the cell at seams or other available egress points. An example of a less wettable material is polypropylene.

After the can or other containment vessel is filled with electrolyte, the vessel is sealed to isolate the electrodes and electrolyte from the environment as shown in FIG. 1B. The gasket is typically sealed by a crimping process. In certain embodiments, a sealing agent is used to prevent leakage. Examples of suitable sealing agents include bituminous sealing agents, tar and VERSAMID® available from Cognis of Cincinnati, Ohio.

In certain embodiments, the cell is configured to operate in an electrolyte "starved" condition. Further, in certain embodiments, a nickel-zinc cells of this invention employ a starved electrolyte format. Such cells have relatively low quantities electrolyte in relation to the amount of active electrode material. They can be easily distinguished from flooded cells, which have free liquid electrolyte in interior regions of the cell. As discussed in U.S. patent application Ser. No. 11/116,113, filed Apr. 26, 2005, titled "Nickel Zinc Battery Design," hereby incorporated by reference, it may be desirable to operate a cell at starved conditions for a variety of reasons. A starved cell is generally understood to be one in which the total void volume within the cell electrode stack is not fully occupied by electrolyte. In a typical example, the void volume of a starved cell after electrolyte fill may be at least about 10% of the total void volume before fill.

The battery cells of this invention can have any of a number of different shapes and sizes. For example, cylindrical cells of this invention may have the diameter and length of conventional AAA cells, AA cells, A cells, C cells, etc. Custom cell designs are appropriate in some applications. In a specific embodiment, the cell size is a sub-C cell size of diameter 22 mm and length 43 mm. Note that the present invention also may be employed in relatively small prismatic cell formats, as well as various larger format cells employed for various non-portable applications. Often the profile of a battery pack for, e.g., a power tool or lawn tool will dictate the size and shape of the battery cells. This invention also pertains to battery packs including one or more nickel-zinc battery cells of this invention and appropriate casing, contacts, and conductive lines to permit charge and discharge in an electric device.

Note that the embodiment shown in FIGS. 1A and 1B has a polarity reverse of that in a conventional nickel-cadmium cell, in that the cap is negative and the can is positive. In conventional power cells, the polarity of the cell is such that the cap is positive and the can or vessel is negative. That is, the positive electrode of the cell assembly is electrically connected with the cap and the negative electrode of the cell assembly is electrically connected with the can that retains the cell assembly. In a certain embodiments of this invention, including that depicted in FIGS. 1A and 1B, the polarity of the cell is opposite of that of a conventional cell. Thus, the negative electrode is electrically connected with the cap and the positive electrode is electrically connected to the can. It should be understood that in certain embodiments of this invention, the polarity remains the same as in conventional designs—with a positive cap.

The can is the vessel serving as the outer housing or casing of the final cell. In conventional cells, where the can is the negative terminal, it is typically nickel-plated steel. As indicated, in this invention the can may be either the negative or positive terminal. In embodiments in which the can is negative, the can material may be of a composition similar to that employed in a conventional nickel cadmium battery, such as steel, as long as the material is coated with another material compatible with the potential of the zinc electrode. For example, a negative can may be coated with a material such as copper to prevent corrosion. In embodiments where the can is positive and the cap negative, the can may be a composition similar to that used in convention nickel-cadmium cells, typically nickel-plated steel.

In some embodiments, the interior of the can may be coated with a material to aid hydrogen recombination. Any material that catalyzes hydrogen recombination may be used. An example of such a material is silver oxide.

Venting Cap

Although the cell is generally sealed from the environment, the cell may be permitted to vent gases from the battery that are generated during charge and discharge. A typical nickel cadmium cell vents gas at pressures of approximately 200 Pounds per Square Inch (PSI). In some embodiments, a nickel zinc cell is designed to operate at this pressure and even higher (e.g., up to about 300 PSI) without the need to vent. This may encourage recombination of any oxygen and hydrogen generated within the cell. In certain embodiments, the cell is constructed to maintain an internal pressure of up to about 450 PSI and or even up to about 600 PSI. In other embodiments, a nickel zinc cell is designed to vent gas at relatively lower pressures. This may be appropriate when the design encourages controlled release of hydrogen and/or oxygen gases without their recombination within the cell.

Some details of the structure of a vent cap and disk, as well as the carrier substrate itself, are found in the following patent applications which are incorporated herein by reference for all purposes: PCT/US2006/015807 filed Apr. 25, 2006 and PCT/US2004/026859 filed Aug. 17, 2004 (publication WO 2005/020353 A3).

The Electrodes and Separator Structure

FIG. 2 illustrates layers in the negative electrode-separator-positive electrode sandwich structure which may be used in a jellyroll or prismatic cell structure. The separator 205 mechanically and electrically separates the negative electrode (components 201 and 203) from the positive electrode (components 207 and 209) while allowing ionic current to flow between the electrodes. The negative electrode includes electrochemically active layers 201 and an electrode substrate 203. The electrochemically active layers 201 of the zinc negative electrode typically include zinc oxide and/or zinc metal as the electrochemically active material. The layer 201 may also include other additives or electrochemically active compounds such as calcium zincate, bismuth oxide, aluminum oxide, indium oxide, hydroxyethyl cellulose, and a dispersant. The composition of zinc negative electrodes in accordance with certain embodiments will be described in more detail below.

The negative electrode substrate 203 should be electrochemically compatible with the negative electrode materials 201. As described above, the electrode substrate may have the structure of a perforated metal sheet, an expanded metal, a metal foam, or a patterned continuous metal sheet. In some embodiments, the substrate is simply a metal layer such as a metal foil.

Opposite from the negative electrode on the other side of the separator 205 is the positive electrode. The positive electrode also includes electrochemically active layers 207 and an electrode substrate 209. The layers 207 of the positive electrode may include nickel hydroxide, nickel oxide, and/or nickel oxyhydroxide as electrochemically active materials and various additives, all of which are described herein. The electrode substrate 209 may be, for example, a nickel metal foam matrix or nickel metal sheets. Note that if a nickel foam matrix is used, then layers 907 would form one continuous electrode.

The Separator

Typically, a separator will have small pores. In certain embodiments the separator includes multiple layers. The pores and/or laminate structure may provide a tortuous path for zinc dendrites and therefore effectively bar penetration and shorting by dendrites. Preferably, the porous separator has a tortuosity of between about 1.5 and 10, more preferably between about 2 and 5. The average pore diameter is preferably at most about 0.2 microns, and more preferably between about 0.02 and 0.1 microns. Also, the pore size is preferably fairly uniform in the separator. In a specific embodiment, the separator has a porosity of between about 35 and 55% with one preferred material having 45% porosity and a pore size of 0.1 micron.

In a certain embodiments, the separator comprises at least two layers (and preferably exactly two layers)—a barrier layer to block zinc penetration and a wetting layer to keep the cell wet with electrolyte, allowing ionic current to flow. This is generally not the case with nickel cadmium cells, which employ only a single separator material between adjacent electrode layers.

Performance of the cell may be aided by keeping the positive electrode wet and the negative electrode relatively dry. Thus, in some embodiments, the barrier layer is located adjacent to the negative electrode and the wetting layer is located adjacent to the positive electrode. This arrangement improves performance of the cell by maintaining electrolyte in intimate contact with the positive electrode.

In other embodiments, the wetting layer is placed adjacent to the negative electrode and the barrier layer is placed adjacent to the positive electrode. This arrangement aids recombination of oxygen at the negative electrode by facilitating oxygen transport to the negative electrode via the electrolyte.

The barrier layer is typically a microporous membrane. Any microporous membrane that is ionically conductive may be used. Often a polyolefin having a porosity of between about 30 and 80 percent, and an average pore size of between about 0.005 and 0.3 micron will be suitable. In a preferred embodiment, the barrier layer is a microporous polypropylene. The barrier layer is typically about 0.5-4 mils thick, more preferably between about 1 and 3 mils thick.

The wetting layer may be made of any suitable wettable separator material. Typically the wetting layer has a relatively high porosity e.g., between about 50 and 85% porosity. Examples include polyamide materials such as nylon-based as well as wettable polyethylene and polypropylene materials. In certain embodiments, the wetting layer is between about 1 and 10 mils thick, more preferably between about 3 and 6 mils thick. Examples of separate materials that may be employed as the wetting material include NKK VL100 (NKK Corporation, Tokyo, Japan), Freudenberg FS2213E, Scimat 650/45 (SciMAT Limited, Swindon, UK), and Vilene FV4365.

Other separator materials known in the art may be employed. As indicated, nylon-based materials and microporous polyolefins (e.g., polyethylenes and polypropylenes) are very often suitable.

Another consideration in the electrode/separator design is whether to provide the separator as simple sheets of approximately the same width as the electrode and current collector sheet or to encase one or both electrodes in separator layers. In the latter example, the separator serves as a "bag" for one of the electrode sheets, effectively encapsulating an electrode layer. In some embodiments, encapsulating the negative electrode in a separator layer will aid in preventing dendrite formation. In other embodiments, however, use of a barrier layer sheet without encapsulating an electrode is sufficient protection against dendrite penetration.

The Electrolyte

In certain embodiments pertaining to nickel-zinc cells, the electrolyte composition limits dendrite formation and other forms of material redistribution in the zinc electrode. Examples of suitable electrolytes are described in U.S. Pat. No. 5,215,836 issued to M. Eisenberg on Jun. 1, 1993, which is hereby incorporated by reference. In some cases, the electrolyte includes (1) an alkali or earth alkali hydroxide, (2) a soluble alkali or earth alkali fluoride, and (3) a borate, arsenate, and/or phosphate salt (e.g., potassium borate, potassium metaborate, sodium borate, sodium metaborate, and/or a sodium or potassium phosphate). In one specific embodiment, the electrolyte comprises about 4.5 to 10 equiv/liter of potassium hydroxide, from about 2 to 6 equiv/liter boric acid or sodium metaborate and from about 0.01 to 1 equivalents of potassium fluoride. A specific preferred electrolyte for high rate applications comprises about 8.5 equiv/liter of hydroxide, about 4.5 equivalents of boric acid and about 0.2 equivalents of potassium fluoride.

The invention is not limited to the electrolyte compositions presented in the Eisenberg patent. Generally, any electrolyte composition meeting the criteria specified for the applications of interest will suffice. Assuming that high power applications are desired, then the electrolyte should have very good conductivity. Assuming that long cycle life is desired, then the electrolyte should resist dendrite formation. In the present invention, the use of borate and/or fluoride containing KOH electrolyte along with appropriate separator layers reduces the formation of dendrites thus achieving a more robust and long-lived power cell.

In a specific embodiment, the electrolyte composition includes an excess of between about 3 and 5 equiv/liter hydroxide (e.g., KOH, NaOH, and/or LiOH). This assumes that the negative electrode is a zinc oxide based electrode. For calcium zincate negative electrodes, alternate electrolyte formulations may be appropriate. In one example, an appropriate electrolyte for calcium zincate has the following composition: about 15 to 25% by weight KOH, about 0.5 to 5.0% by weight LiOH.

According to various embodiments, the electrolyte may comprise a liquid and a gel. The gel electrolyte may comprise a thickening agent such as CARBOPOL® available from Noveon of Cleveland, Ohio. In a preferred embodiment, a fraction of the active electrolyte material is in gel form. In a specific embodiment, about 5-25% by weight of the electrolyte is provided as gel and the gel component comprises about 1-2% by weight CARBOPOL®.

In some cases, the electrolyte may contain a relatively high concentration of phosphate ion as discussed in previous referenced US Patent Publication No. US20060127761.

The Negative Electrode

As applied to nickel-zinc cells, the negative electrode includes one or more electroactive sources of zinc or zincate ions optionally in combination with one or more additional materials such as conductivity enhancing materials, corrosion inhibitors, wetting agents, etc. as described below. When the electrode is fabricated it will be characterized by certain physical, chemical, and morphological features such as coulombic capacity, chemical composition of the active zinc, porosity, tortuosity, etc.

In certain embodiments, the electrochemically active zinc source may include one or more of the following components: zinc oxide, calcium zincate, zinc metal, and various zinc alloys. Any of these materials may be provided during fabrication and/or be created during normal cell cycling. As a particular example, consider calcium zincate, which may be produced from a paste or slurry containing, e.g., calcium oxide and zinc oxide. Metallic zinc particles may create and maintain a conductive matrix during cycling.

If a zinc alloy is employed, it may in certain embodiments include bismuth and/or indium. In certain embodiments, it may include up to about 20 parts per million lead and in other embodiments up to about 10 parts per million lead. A commercially available source of zinc alloy meeting this composition requirement is PG101 provided by Noranda Corporation of Canada.

The zinc active material may exist in the form of a powder, a granular composition, etc. Preferably, each of the components employed in a zinc electrode paste formulation has a relatively small particle size. This is to reduce the likelihood that a particle may penetrate or otherwise damage the separator between the positive and negative electrodes.

In addition to the electrochemically active zinc component(s), the negative electrode may include one or more additional materials that facilitate or otherwise impact certain processes within the electrode such as ion transport, electron transport (e.g., the material enhances conductivity), wetting, porosity, structural integrity (e.g., binding), gassing, active material solubility, barrier properties (e.g., reducing the amount of zinc leaving the electrode), corrosion inhibition etc.

For example, in some embodiments, the negative electrode includes an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. It may facilitate recombination of hydrogen and oxygen. Indium oxide may be present in a concentration of between about 0.05 and 1% by weight of a dry negative electrode formulation. Aluminum oxide may be provided in a concentration of between about 1 and 5% by weight of a dry negative electrode formulation.

In certain embodiments, one or more additives may be included to improve corrosion resistance of the zinc electroactive material and thereby facilitate long shelf life. The shelf life can be critical to the commercial success or failure of a battery cell. Recognizing that batteries are intrinsically chemically unstable devices, steps may be taken to preserve battery components, including the negative electrode, in their chemically useful form. When electrode materials corrode or otherwise degrade to a significant extent over weeks or months without use, their value becomes limited by short shelf life. The inventors have found that an addition of small amounts of lead and tin is very effective to improve zinc corrosion resistance.

Chireau et al. in U.S. Pat. No. 4,118,551 discusses the use of salts of lead and cadmium to reduce corrosion of zinc. The present method of adding lead and/or tin not only reduces corrosion of zinc, but also improves the cycle life and stability of the fabrication mixture (e.g., a slurry or paste) for making the negative electrode. This is accomplished with a much lower amount of lead than that disclosed in Chireau. In the present method, typical lead addition is only 0.02% by weight, where as in Chireau, the amount is about 1% by weight.

According to various embodiments, the zinc negative electrode is made by first treating zinc particles, mixing the remaining paste ingredients, and incorporating the paste into a zinc electrode. Lead and/or tin may be coated onto the zinc particles in the first step. A soluble source of lead and/or a soluble source of tin is added to zinc particles in a liquid medium, preferably water. A binding agent and a dispersant may be added too to create a coated zinc particle slurry. The soluble lead may be one or more of lead acetate, lead chloride, lead fluoborate, and lead nitrate. The soluble tin may be one or more of tin sulfate, tin acetate, tin chloride, tin fluoborate, and tin nitrate. The soluble lead and tin may be added together in a premix or added separately, in powder form or pre-dissolved. In certain embodiments, the coated zinc particles are obtained pre-made and the inventive process dispenses with the initial treatment operation.

In certain embodiments, the uncoated zinc metal (or zinc alloy) powder particles used in the negative electrode are less than about 40 microns in size, or less than about 25 microns in size, or about 5-15 microns in size. In some cases, they may be selected by size by passing through a sieve. Thus, the "size" of a zinc particle may often be viewed as the minimum dimension of the particles, as the particles may have many different shapes and aspect ratios. Suitable zinc alloy particles include zinc alloys of lead, bismuth, and indium.

After the coating operation, the zinc metal particles may be completely or partially coated. The lead coating may be less than about 0.25% percent by weight of the coated zinc particle. The tin coating may be less than about 5% percent by weight of the coated particle. The zinc metal particles may be 5-30% or about 20% of the dry paste by weight. Thus, the lead concentration in the dry paste may be less about 0.08% or less than about 0.05%, and the tin coating less than about 1.5% or less than about 1% in the dry paste by weight.

After the soluble species (tin and/or lead) have completely dissolved, adequate time has passed for the coating reaction, and a desired consistency is reached, the remaining zinc electrode constituents may be mixed into the slurry or paste. Note that some dissolved lead and tin salt may remain in the slurry. The remaining zinc electrode constituents include zinc oxide, and optionally bismuth oxide, alumina, indium, and potassium fluoride or calcium. More zinc particles may be added at this stage. These remaining zinc electrode constituents may be premixed in a powder form. A negative paste or slurry is thus formed and is used to coat the negative electrode substrate. In this paste, the lead is preferably between 0% and about 0.05% by weight. The tin is preferably between 0% and about 1% by weight.

In certain embodiments, various operations described above may be changed without affecting the result. For example, a variation on the process may be used to reduce paste agglomeration. In certain embodiments, the agglomeration reduction process involves mixing the binding agent, dispersant, and lead acetate together first for, e.g., about 5 minutes in a mixer. The binding agent may be a hydroxy-ethyl cellulose. The dispersant may be a commercially available oxide dispersant such as Nopcosperse available from San Nopco Ltd. of Kyoto Japan. After this initial mixing, the remainder of the zinc electrode constituent is added to the mixer in a pre-mixed powder form. The remaining constituent may include zinc oxide, zinc powder, alumina, bismuth oxide, indium, potassium fluoride or calcium. These ingredients are mixed at a high rpm (e.g., over 2000) for about 5 minutes. Lastly, a pre-dissolved tin salt, e.g., tin sulfate, is added slowly to the mixture. The entire batch may be further mixed for up to 25 minutes. In this anti-agglomeration process, the dissolved tin salt may not coat the zinc particle as much as if it were added earlier. The lead deposit therefore may account for the redox potential.

In other embodiments, the first mixture may include soluble tin acetate without the zinc particles, which is added in the bulk mixing step. It is believed that the zinc particles are adequately coated with lead and/or tin even when they are added with other constituents.

It is believed that the additions of soluble tin and/or lead salts coat the zinc powder used in the mix and inhibit either corrosion or undesirable reactions with the other mix ingredients. Though not intending to be bound by these theories, one mode of corrosion mitigation is having the lead and tin available to alloy with cobalt wherein the resulting alloy is less catalytic in the zinc corrosion reaction. Another mode of corrosion mitigation is the physical coating of the zinc particle and rendering its surfaces unavailable for the corrosion reaction. Note that the zinc particle coating operation is not believed to create a zinc alloy with lead or tin. The reaction appears to be a displacement reaction on the zinc particle surface.

Specific examples of anions that may be included to reduce the solubility of zinc in the electrolyte include phosphate, fluoride, borate, zincate, silicate, stearate, etc. Generally, these anions may be present in a negative electrode in concentrations of up to about 5% by weight of a dry negative electrode formulation. It is believed that at least certain of these anions go into solution during cell cycling and there they reduce the solubility of zinc. Examples of electrode formulations including these materials are included in the following patents and patent applications, each of which is incorporated herein by reference for all purposes: U.S. Pat. No. 6,797,433, issued Sep. 28, 2004, titled, "Negative Electrode Formulation for a Low Toxicity Zinc Electrode Having Additives with Redox Potentials Negative to Zinc Potential," by Jeffrey Phillips; U.S. Pat. No. 6,835,499, issued Dec. 28, 2004, titled, "Negative Electrode Formulation for a Low Toxicity Zinc Electrode Having Additives with Redox Potentials Positive to Zinc Potential," by Jeffrey Phillips; U.S. Pat. No. 6,818,350, issued Nov. 16, 2004, titled, "Alkaline Cells Having Low Toxicity Rechargeable Zinc Electrodes," by Jeffrey Phillips; and PCT/NZ02/00036 (publication no. WO 02/075830) filed Mar. 15, 2002 by Hall et al.

Examples of materials that may be added to the negative electrode to improve wetting include titanium oxides, alumina, silica, alumina and silica together, etc. Generally, these materials are provided in concentrations of up to about 10% by weight of a dry negative electrode formulation. A further discussion of such materials may be found in U.S. Pat. No. 6,811,926, issued Nov. 2, 2004, titled, "Formulation of Zinc Negative Electrode for Rechargeable Cells Having an Alkaline Electrolyte," by Jeffrey Phillips, which is incorporated herein by reference for all purposes.

Examples of materials that may be added to the negative electrode to improve electronic conductance include various electrode compatible materials having high intrinsic electronic conductivity. Examples include titanium oxides, etc.

Generally, these materials are provided in concentrations of up to about 10% by weight of a dry negative electrode formulation. The exact concentration will depend, of course, on the properties of chosen additive.

Various organic materials may be added to the negative electrode for the purpose of binding, dispersion, and/or as surrogates for separators. Examples include hydroxylethyl cellulose (HEC), carboxymethyl cellulose (CMC), the free acid form of carboxymethyl cellulose (HCMC), polytetrafluoroethylene (PTFE), polystyrene sulfonate (PSS), polyvinyl alcohol (PVA), nopcosperse dispersants (available from San Nopco Ltd. of Kyoto Japan), etc. Note that some of the organic materials added during fabrication of the electrode may be removed before the final assembly of the cell. In some embodiments, the organic material is at least partially removed by heating a partially fabricated electrode to burn out the organic material.

In certain embodiments, polymeric materials such as PSS and PVA may be mixed with the paste formation (as opposed to coating) for the purpose of burying sharp or large particles in the electrode that might otherwise pose a danger to the separator.

When defining an electrode composition herein, it is generally understood as being applicable to the composition as produced at the time of fabrication (e.g., the composition of a paste, slurry, or dry fabrication formulation), as well as compositions that might result during or after formation cycling or during or after one or more charge-discharge cycles while the cell is in use such as while powering a portable tool.

Various negative electrode compositions within the scope of this invention are described in the PCT Publication No. WO 02/039534 and (J. Phillips) and others cited above, each of which is incorporated herein by reference. Negative electrode additives in the above references include, for example, silica and fluorides of various alkaline earth metals, transition metals, heavy metals, and noble metals.

The Positive Electrode

The nickel hydroxide electrode has been used as the positive electrode in high power and high energy nickel-metal hydride batteries, nickel-cadmium batteries and nickel-zinc batteries. The pasted nickel hydroxide electrode typically includes nickel hydroxide, cobalt/cobalt compound powder, nickel powder and binding materials. The cobalt compound is included to increase the conductivity of the nickel electrode. However, as explained, the same cobalt compound causes detrimental effects if it migrates to the zinc negative electrode.

According to various embodiments, the positive electrode formulation may include nickel oxide particles and cobalt. A nickel foam matrix is preferably used to support the electroactive nickel oxide (e.g., $Ni(OH)_2$) electrode material. The foam substrate thickness may be may be between 15 and 60 mils. The thickness of the positive electrode, comprising nickel foam filled with the electrochemically active and other electrode materials, ranges from about 16-24 mils, preferably about 20 mils thick. In one embodiment, a nickel foam density of about 350 $g/m^2$ and thickness ranging from about 16-18 mils is used.

The positive electrode generally includes an electrochemically active nickel oxide or hydroxide and one or more additives to facilitate manufacturing, electron transport, wetting, mechanical properties, etc. For example, a positive electrode formulation may include nickel hydroxide particles, zinc oxide, cobalt oxide (CoO), cobalt metal, nickel metal, and a thixotropic agent such as carboxymethyl cellulose (CMC). Note that the metallic nickel and cobalt may be chemically pure or alloys. The positive electrode may be made from paste containing these materials and binder such as Teflon suspension.

In certain embodiments, the batteries include a non-nickel positive electrode. Of course, the positive electrode composition depends on the battery system chosen. For example, in systems such as silver-zinc or zinc-air batteries, the positive material is completely different from that used Ni—Zn batteries. The silver-zinc system employs silver-oxide as the positive electrode whereas in zinc-air batteries a gas-diffusion electrode containing catalysis for oxygen reduction-production is employed. Any of these positive electrodes may be used with zinc negative electrodes of the type described herein.

EXPERIMENTAL

Two slurries were prepared with and without the tin and lead combination with compositions shown below.

Composition 1 (shown as 103 in FIG. 1) is referred to as Cohesive w/PbAc—$SnSO_4$ and contains 3000 parts by weight of ZnO, 97 parts by weight of $Bi_2O_3$, 20 parts by weight of hydroxy-ethyl cellulose, 2100 parts by weight water, 240 parts by weight of a slurry containing 60% Teflon binder, 600 parts by weight metallic zinc powder, 1.4 parts lead salt containing 55% lead and 40 parts tin salt containing 55% tin.

Composition 2 (shown as 101 in FIG. 1) is called the Cohesive Control. It is identical to Composition 1 without any tin and lead added.

Figure 3:
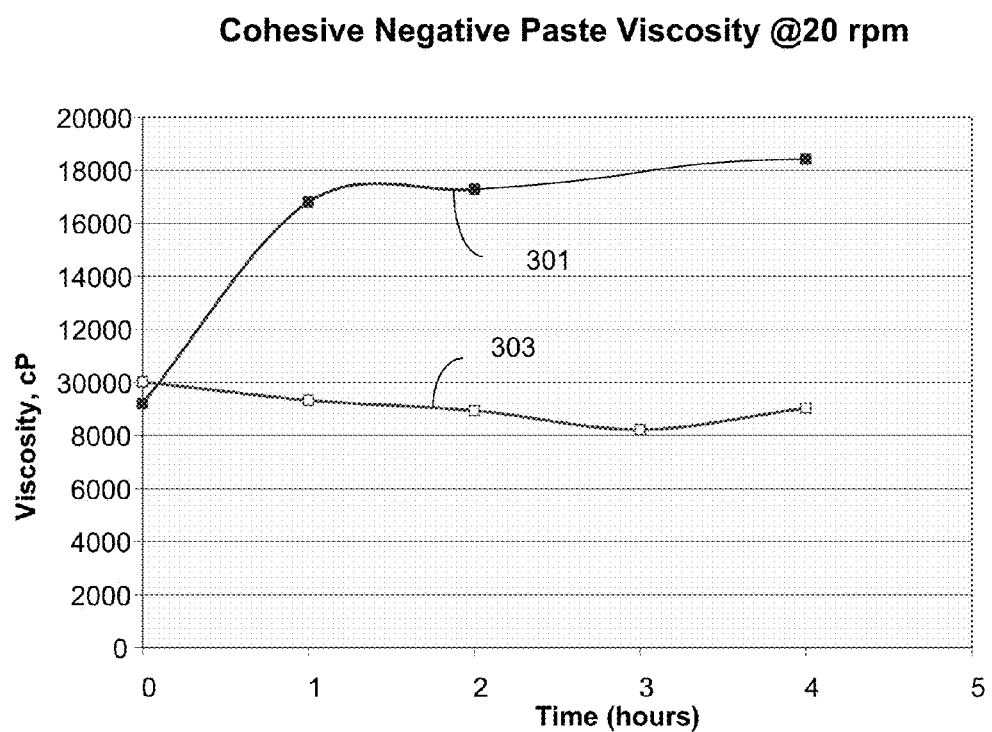
FIG. 3 is a viscosity plot comparing negative active material pastes with and without tin and lead coating on the zinc particles.

FIG. 3 compares the stability of the viscosity over time for these two compositions, as the slurry was mildly stirred at 20 rpm. As shown, composition 2 (line 303) maintained its viscosity much better than the control. The two compositions started with very similar viscosities; however, for the control paste 301, viscosity increased significantly during the first hour and stayed fairly constant. The increased viscosity after only one hour reduces the ability for the paste to be worked after one hour and reduces manufacturability.

Figure 4A:
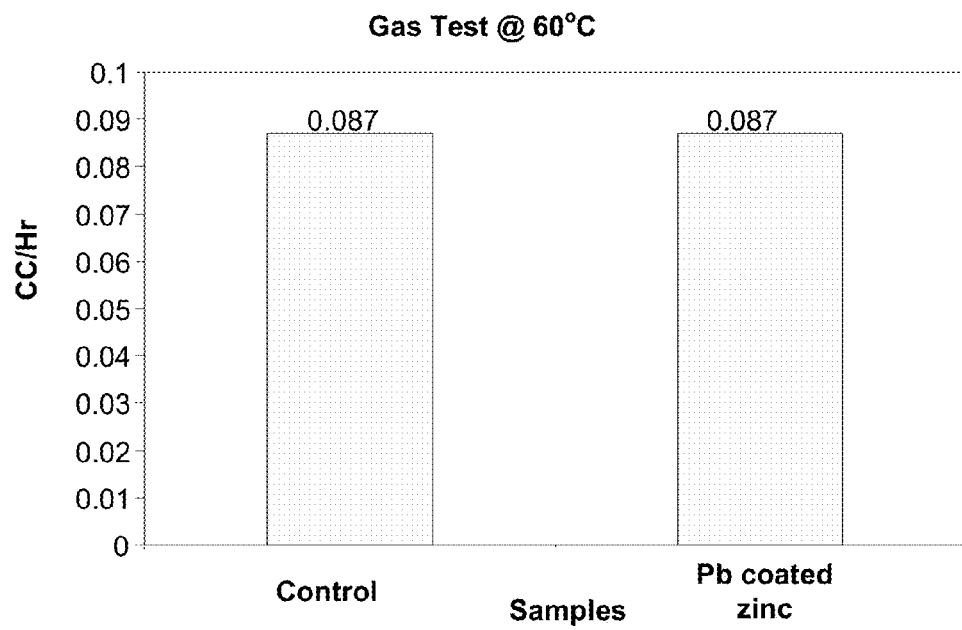
FIG. 4A is a bar diagram showing the effect of lead on the corrosion rate of zinc in an alkaline solution.

The reduced corrosion associated with the coating of zinc particles with lead was demonstrated in the experiment shown as FIG. 4A. Five grams of zinc powder with a particle size of less than about 25 microns was coated with lead using a solution containing 0.015 g lead acetate hydrate. The coated zinc was then immersed in a solution with composition of 760 g $H_2O$, 1220 g 45% potassium hydroxide solution, 84.7 g sodium phosphate ($Na_3PO_4.12H_2O$), 59 g sodium hydroxide, 16.8 g lithium hydroxide, and 3.2 g zinc oxide (ZnO). The temperature of the mixture was raised to 60° C. and the gas generated due to the corrosion of zinc was collected and measured. The same test was carried out with uncoated zinc in the same solution as a control. FIG. 4A shows about the same gas test results for the control mixture and for the mixture with lead coated zinc. The result shows that the lead coating does not have an effect on corrosion.

Figure 4B:
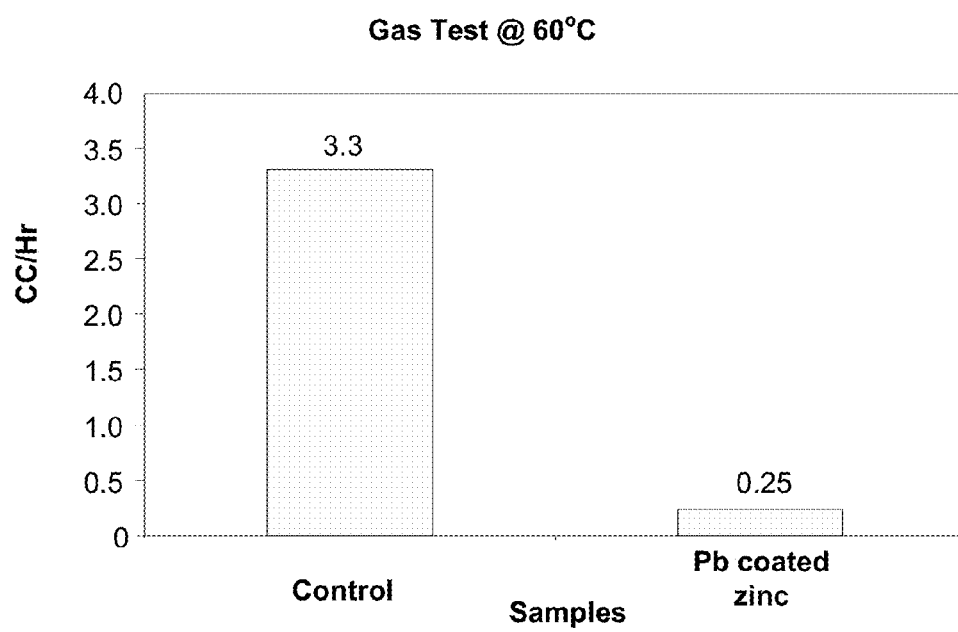
FIG. 4B is a bar graph showing the effect of lead on the corrosion rate of zinc in an alkaline solution with cobalt.

The comparison was carried out again with same electrolyte, but with 0.05% $Co(OH)_2$ added. The result is shown in FIG. 4B. The control sample with uncoated zinc particles generated 3.3 CC/hr of hydrogen gas. The sample with lead coated zinc particles generated 0.25 CC/hr of hydrogen gas. Note that the gassing is much higher as compared to the gas test result of FIG. 4A, due to the catalytic effect of cobalt on zinc corrosion. The lead coated zinc mixture produced gas at a rate over ten times less than that of the control mixture with uncoated zinc. The result shows that the catalytic effect of contaminants on corrosion was considerably mitigated by using lead coated zinc particles.

Standard sub-C size cells were made with negative pastes with various concentrations of tin and lead and keeping all other components the same. The cells employed an electrolyte having a composition of 760 g $H_2O$, 1220 g 45% potassium hydroxide solution, 84.7 g sodium phosphate ($Na_3PO_4 \cdot 12H_2O$), 59 g Sodium hydroxide, 16.8 g Lithium hydroxide, 3.2 g Zinc oxide (ZnO). A microporous 50 micron separator manufactured by UBE and a cellulose—polyvinyl alcohol wicking separator were used in between the two electrodes.

The cells were then tested for cycling and gassing reduction. The positive electrodes were prepared with nickel hydroxide that included a cobalt (III) coated layer that provided inter-particle conductivity. Cobalt metal powder (2%) and nickel powder (9%) was added to the positive paste mix to provide additional conductivity for high discharge rate capability. During the 1-2 hour soak times that exist between filling the cell and the application of the first formation charge the added cobalt can dissolve and migrate to the negative electrode.

The formation of all cells listed above was carried out identically. Formation of cells refers to the initial electrical charging. Each cell was charged at 91 mA for 20.5 hrs and discharged at 1 A to 1.0V. Then they were charged at 0.1 A for 18 hrs and at 0.075 A for 6.5 hrs.

The following tables show examples where gassing of zinc electrode in the cell was reduced by using tin and lead, separately and together. The testing is carried out at 60° C. to accelerate the corrosion effect. The cells were opened and kept under inverted measuring cylinder containing mineral oil. The gas collected in the measuring cylinder was recorded. The gas was analyzed using a gas chromatograph and was found to be mainly hydrogen and therefore produced as a result of zinc reacting with alkali in the electrolyte according to the reaction:

$$Zn + 2OH(-) \rightarrow ZnO_2(2-) + H_2$$

TABLE 1

A Comparison of Cell Gassing Rates (Control vs Negative containing lead)
Cell Gassing: Lead Acetate Added to Negative Paste

| | Composition | | Gassing Rate | % Gassing |
|---|---|---|---|---|
| Group Description | Added % Pb | % Sn | cc/day | Reduction |
| 83501 - Control | 0 | 0 | 4.38 | 57.53 |
| 83507 - Pb Acetate | 0.05 | 0 | 1.86 | |
| 84502 - Control | 0 | 0 | 4.00 | 71.25 |
| 84503 - Pb Acetate | 0.05 | 0 | 1.15 | |

Table 1 shows the test results for two sets of comparisons. In both sets, a control cell and a cell containing 0.05% lead in the negative paste are compared. The lead in the negative electrode is added by coating the zinc particles with lead acetate. In one set, the gassing was reduced by 58%. In another, the gassing was reduced by 71%.

TABLE 2

A Comparison of Cell Gassing Rates (Control Cell vs. Negative containing tin)
Cell Gassing: Tin Sulfate Added to Negative Paste

| | Composition | | Gassing Rate | % Gassing |
|---|---|---|---|---|
| Group Description | Added % Pb | % Sn | cc/day | Reduction |
| 83601 - Control | 0 | 0 | 3.55 | 78.87 |
| 83606 - SnSO4 | 0 | 0.507 | 0.75 | |
| 84302 - Control | 0 | 0 | 3.80 | 60.53 |
| 84304 - SnSO4 | 0 | 0.507 | 1.50 | |
| 84901 - Control | 0 | 0 | 7.30 | 52.05 |
| 84902 - SnSO4 | 0 | 0.507 | 3.50 | |
| 85201 - Control | 0 | 0 | 9.40 | 63.83 |
| 85202 - SnSO4 | 0 | 0.507 | 3.40 | |
| 90101 - Control | 0 | 0 | 12.23 | 63.21 |
| 90103 - SnSO4 | 0 | 0.507 | 4.50 | |
| 90501 - Control | 0 | 0 | 8.85 | 23.73 |
| 90502 - SnSO4 | 0 | 0.254 | 6.75 | |

Six sets of comparisons were made in Table 2. In these sets, a control cell and a cell containing tin in the negative electrode are compared. The tin in the negative electrode is added by coating the zinc particles with tin sulfate. In five sets, the negative paste contained 0.5% tin. In one set, the negative paste contained 0.25% tin. The results show a gassing reduction between about 50-80% for the higher tin concentration cell and a 24% reduction for the lower tin concentration cell. According to Table 2, more tin coating improves zinc corrosion mitigation.

TABLE 3

A Comparison of Cell Gassing Rates (Control vs Negative containing tin & lead)
Cell Gassing: Lead Acetate/Tin Sulfate Added to Negative Paste

| | Composition | | Gassing Rate | % Gassing |
|---|---|---|---|---|
| Group Description | Added % Pb | % Sn | cc/day | Reduction |
| 90601 - Control | 0 | 0 | 6.95 | 79.14 |
| 90602A - Pb Acetate/SnSO4 | 0.050 | 0.507 | 1.45 | |
| 90701 - Control | 0 | 0 | 7.95 | 57.23 |
| 90702 - Pb Acetate/SnSO4 | 0.018 | 0.254 | 3.40 | |
| 90801 - Control | 0 | 0 | 6.40 | 64.84 |
| 90802A - Pb Acetate/SnSO4 | 0.018 | 0.254 | 2.25 | |
| 90901 - Control | 0 | 0 | 8.80 | 72.73 |
| 90902A - Pb Acetate/Sn Acetate | 0.018 | 0.231 | 2.40 | |
| 91143B - Control | 0 | 0 | 8.90 | 65.17 |
| 91101 - Pb Acetate/SnSO4 | 0.018 | 0.254 | 3.10 | |
| 91102A - Pb Acetate/SnSO4 | 0.018 | 0.507 | 1.75 | 80.34 |

Figure 5:
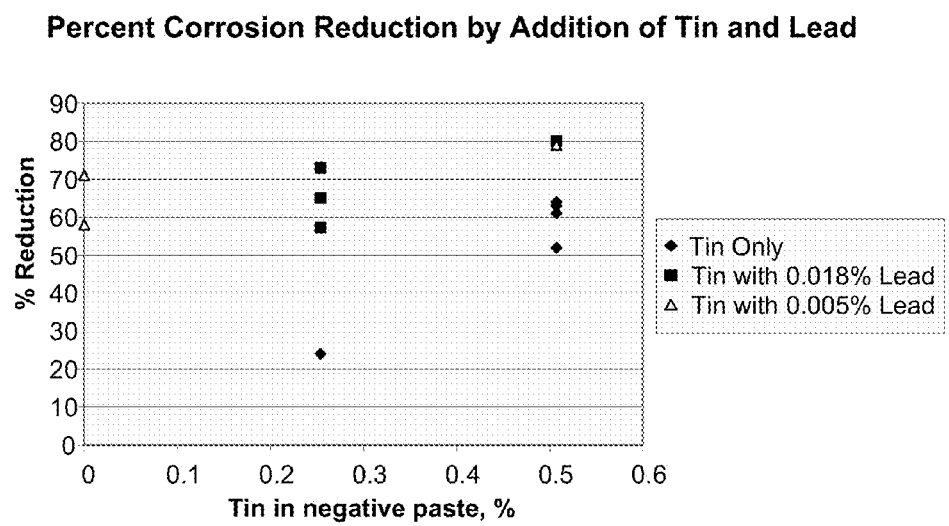
FIG. 5 is a plot showing percent of corrosion reduction for different amounts of tin and lead in the negative paste.

Table 3 shows 5 sets of data for various combinations of lead and tin concentrations. Two levels of lead and approximately two levels of tin were compared with no lead or tin. In every case significant gassing reductions were achieved. The best gassing reductions were found at the tin sulfate level of 0.5%, with the lead concentration either at 0.05% or 0.018%. Note that the low level of lead used in these cells is below the level forbidden by RoHS' environmental standard (Restriction of Hazardous Substances Directive prohibits the use of lead above 1000 ppm in an homogeneous material). However, this small amount of lead coating (about 400 ppm or less) is beneficial against zinc corrosion. Results from Tables 1-3 are also summarized in FIG. 5.

Experiments were also conducted to test a direction addition of tin oxide to the negative mix, instead of coating the zinc particle. The direct addition of tin oxide to the paste mix was ineffective in reducing the gassing rate. Table 4 shows the gassing rate of controls compared to controls with additions of 0.5% tin oxide. In these tests, the gassing rate between the control and the cell with direct tin oxide are very similar.

| Cell Designation | Description | Gassing Rate at 60° C. (cc/hr) |
| --- | --- | --- |
| 84512-05 | Control w/tin oxide addition | 4 |
| 84513-05 | Control | 4.4 |
| 84512-06 | Control w/tin oxide addition | 3.8 |
| 84513-06 | Control | 3.8 |

High discharge rate cycling tests were conducted at room temperature for the many of the cells built as shown above. All cells were charged at 2 A to a constant voltage of 1.9V. This voltage was maintained to an end-of-charge current of 90 mA before discharging at 10 A to an end-of-discharge voltage of 1.0V. A 20 A discharge was imposed to end-of-discharge of 1.0V at cycling number of $8^{th}$, $56^{th}$, $106^{th}$, $156^{th}$, etc. The 10 A and 20 A discharging are high rate discharges consistent with use of high-power tools such as circular saws.

Figure 6A:
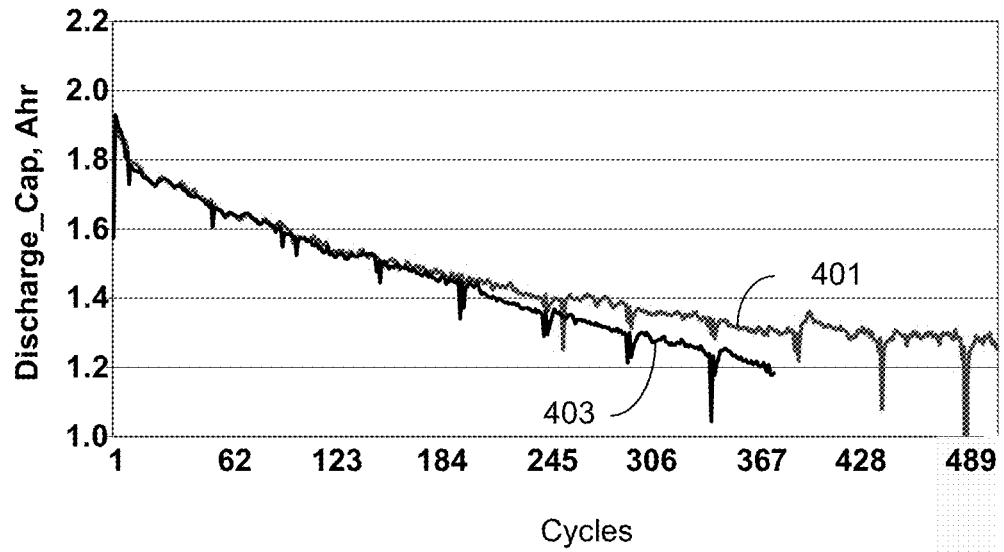
FIG. 6A is a graph of discharge capacity of a cell having lead coated zinc particles and a control cell with uncoated zinc particles.
Figure 6B:
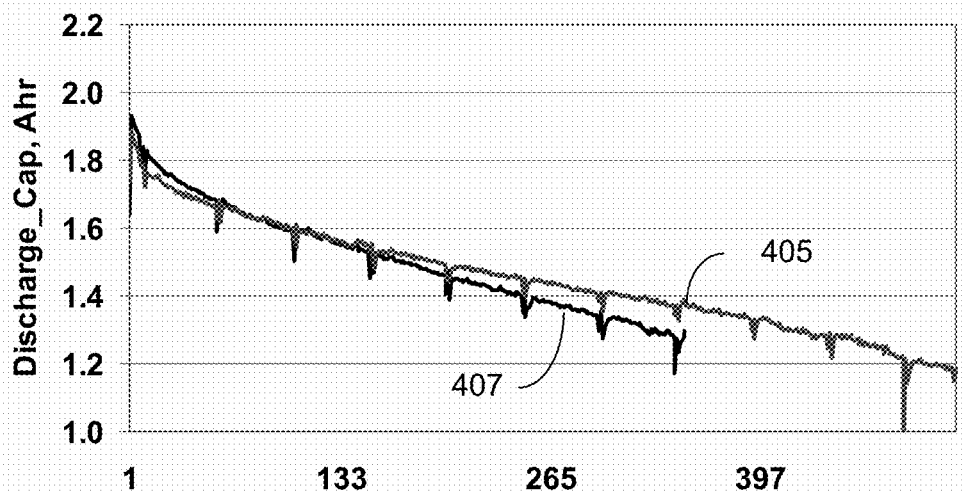
FIG. 6B is a graph of discharge capacity of a cell having tin coated zinc particles and a control cell with uncoated zinc particles.
Figure 7:
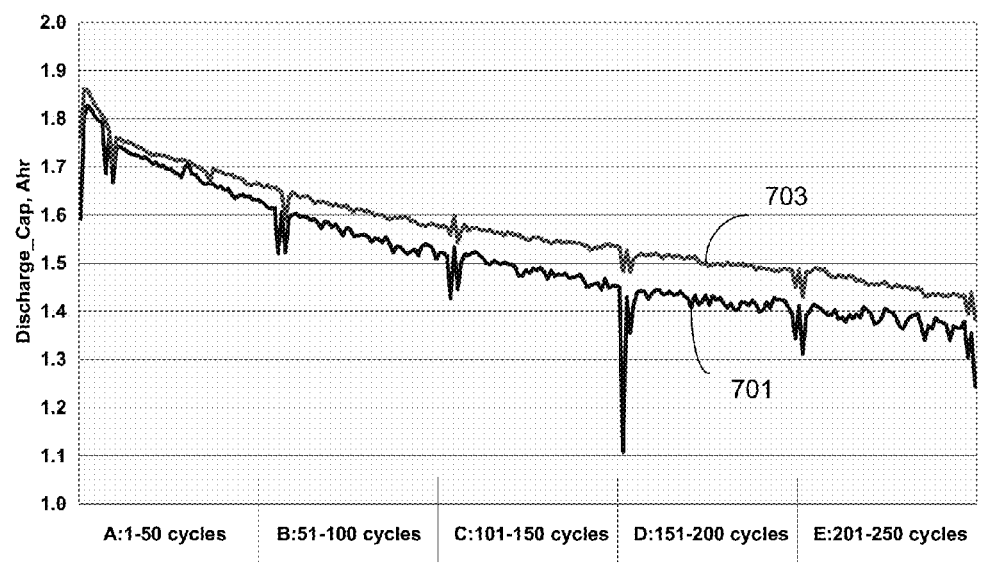
FIG. 7 is a graph of discharge capacity of a cell having lead and tin coated zinc particles and a control cell with uncoated zinc particles.

FIGS. 6A, 6B, and 7 are examples of improvement in cycling of cells built with the addition of lead and tin individually and then combination of the two. They are then compared with control cells referring to cells with no addition of tin and lead. In each case, it is shown that the cycle life is improved. FIG. 6A compares the control cell (plotted as line 403) and the cell made with lead coated zinc particles (line 401), with lead at 0.05%. Both cells behaved similarly until about cycle 150. The cell with lead coated zinc lasted longer a more consistent discharge capacity. The control cell failed earlier and deteriorated at a much faster rate. FIG. 6B compares a control cell (407) and a cell made with tin coated zinc particles (405). The tin concentration was 0.507%, from tin sulfate. The cell with tin coated zinc (405) lasted longer. Its capacity also decreased slower, though the cell with tin coated zinc (405) appears to have a slightly lower initial discharge capacity.

FIG. 7 compares a control cell and a cell having 0.018% lead and 0.254% tin in the negative electrode paste. In this comparison, the cell with tin and lead coated zinc particles consistently has higher discharge capacity. These figures show that cycling performance is improved by coating the zinc particles with lead or lead and tin.

As described above the effect of the additives appears to be in mitigating the catalytic effect of cobalt contamination of the negative electrode. While this is expected to be most beneficial to pasted positive electrodes where either cobalt metal or cobalt (II) oxide is added to the paste there is also expected to be a benefit in nickel zinc cells where cobalt is primarily present as cobalt (III) on the surface of the nickel hydroxide particles. Even though this material should be relatively insoluble in alkaline electrolytes there appears to be some migration of the cobalt to the negative after several hours of soaking. In these cases it is suspected that the either the surface cobalt may not be fully oxidized or that it has been reduced over time to soluble cobalt (II) oxide by other materials in the positive paste.

CONCLUSION

The addition of small quantities of lead and tin salts to the paste mix for a slurry coated zinc electrode for a rechargeable nickel-zinc electrochemical cell leads to many advantages both in the manufacturability of the paste and in the reduction of the corrosion of zinc in the final cell configuration. More specifically the "pot" life of the slurry mix has been extended over 4 hours. Though not intending to be bound by this theory, it is believed that the additions coat the zinc powder used in the mix and inhibit either corrosion or undesirable reactions with the other mix ingredients. Once the cell is assembled and formed there is a significant reduction in the amount of hydrogen generated within the cell. The hydrogen generated by zinc corrosion has been reduced by up to 80%. It is believed that the lead and/or tin reduce the catalytic effect of cobalt on the hydrogen evolution reaction. Another benefit of the additions is to arrest the continuous capacity fade that is observed as the cell is cycled. The cycle life to a specific capacity values can be enhanced by 33%.

What is claimed is:

1. A method of making a zinc negative electrode, the method comprising:
   (a) forming a coating consisting essentially of tin on zinc alloy particles;
   (b) forming a paste comprising the coated zinc alloy particles, zinc oxide, bismuth oxide, and a binding agent; and
   (c) incorporating the paste into a zinc electrode, wherein the tin comprises less than about 1% by weight of the paste and, wherein the zinc alloy particles comprise an alloy of zinc with an alloying element selected from the group consisting of bismuth, indium, and combinations thereof, and wherein the zinc alloy particles are less than about 100 micrometers in size.

2. The method of claim 1, wherein the coating operation (a) comprises:
   contacting the zinc alloy particles with a solution comprising at least one soluble tin salt.

3. The method of claim 1, further comprising adding a pre-dissolved tin salt solution into the paste.

4. The method of claim 1, wherein coating tin onto the zinc alloy particles comprises contacting the zinc alloy particles with a solution comprising at least one soluble tin salt selected from the group consisting of tin sulfate, tin acetate, tin chloride, tin fluoborate, and tin nitrate.

5. The method of claim 1, wherein the paste further comprises dissolved tin salt.

6. The method of claim 1, wherein the zinc alloy particles are less than about 40 microns in size.

7. A method of making a zinc negative electrode, the method comprising:
   (a) forming a coating consisting essentially of lead on zinc alloy particles;
   (b) forming a paste comprising the coated zinc alloy particles, zinc oxide, bismuth oxide, and a binding agent; and
   (c) incorporating the paste into a zinc electrode, wherein the lead comprises less than about 0.05% by weight of the paste and wherein the zinc alloy particles comprise an alloy of zinc with an alloying element selected from the group consisting of bismuth, indium, and combinations thereof, and wherein the zinc alloy particles are less than about 100 micrometers in size.

8. The method of claim 7, wherein coating lead onto the zinc alloy particles comprises contacting the zinc alloy particles with a solution comprising at least one soluble lead salt selected from the group consisting of lead acetate, lead chloride, lead fluoborate, and lead nitrate.

9. The method of claim 7, wherein the zinc alloy particles are less than about 40 microns in size.

10. A method of making a zinc negative electrode, the method comprising:
   (a) forming a coating consisting essentially of tin and lead on zinc alloy particles;
   (b) forming a paste comprising the coated zinc alloy particles, zinc oxide, bismuth oxide, and a binding agent; and
   (c) incorporating the paste into a zinc electrode, wherein the tin comprises less than about 1% by weight of the paste and lead comprises less than about 0.05% by weight of the paste, and, wherein the zinc alloy particles comprise an alloy of zinc with an alloying element selected from the group consisting of bismuth, indium, and combinations thereof, and wherein the zinc alloy particles are less than about 100 micrometers in size.

11. The method of claim 10, wherein the coating operation (a) comprises:
   contacting the zinc alloy particles with a solution comprising at least one soluble tin salt.

12. The method of claim 10, further comprising adding a pre-dissolved tin salt solution into the paste.

13. The method of claim 10, wherein coating tin onto the zinc alloy particles comprises contacting the zinc alloy particles with a solution comprising at least one soluble tin salt selected from the group consisting of tin sulfate, tin acetate, tin chloride, tin fluoborate, and tin nitrate.

14. The method of claim 10, wherein coating lead onto the zinc alloy particles comprises contacting the zinc alloy particles with a solution comprising at least one soluble lead salt selected from the group consisting of lead acetate, lead chloride, lead fluoborate, and lead nitrate.

15. The method of claim 10, wherein the paste further comprises dissolved tin salt.

16. The method of claim 10, wherein the zinc alloy particles are less than about 40 microns in size.

17. A method of making a rechargeable nickel zinc cell, the method comprising:
   (a) forming a negative zinc electrode comprising zinc powder particles, wherein said zinc powder particles are less than about 100 microns in size and are coated with a coating consisting essentially of tin, wherein the tin comprises less than about 1% by weight of the negative zinc electrode active material;
   (b) forming a nickel positive electrode comprising a material selected from the group consisting of cobalt metal, cobalt compound, and combinations thereof; and
   (c) incorporating the negative zinc electrode and the positive nickel electrode into the cell.

18. The method of claim 17 wherein the zinc powder particles are zinc alloy particles comprising an alloying element selected from the group consisting of bismuth and indium.

19. A method of making a rechargeable nickel zinc cell, the method comprising:
   (a) forming a negative zinc electrode comprising zinc powder particles, wherein said zinc powder particles are less than about 100 microns in size and are coated with a coating consisting essentially of lead, wherein the lead comprises less than about 0.05% by weight of the negative zinc electrode active material;
   (b) forming a nickel positive electrode comprising a material selected from the group consisting of cobalt metal, cobalt compound, and combinations thereof; and
   (c) incorporating the negative zinc electrode and the positive nickel electrode into the cell.

20. A method of making a rechargeable nickel zinc cell, the method comprising:
   (a) forming a negative zinc electrode comprising zinc powder particles, wherein said zinc powder particles are less than about 100 microns in size and are coated with a coating consisting essentially of tin and lead, wherein the tin comprises less than about 1% by weight of the negative zinc electrode active material and the lead comprises less than about 0.05% by weight of the negative zinc electrode active material;
   (b) forming a nickel positive electrode comprising a material selected from the group consisting of cobalt metal, cobalt compound, and combinations thereof; and
   (c) incorporating the negative zinc electrode and the positive nickel electrode into the cell.

* * * * *